Figure 1:
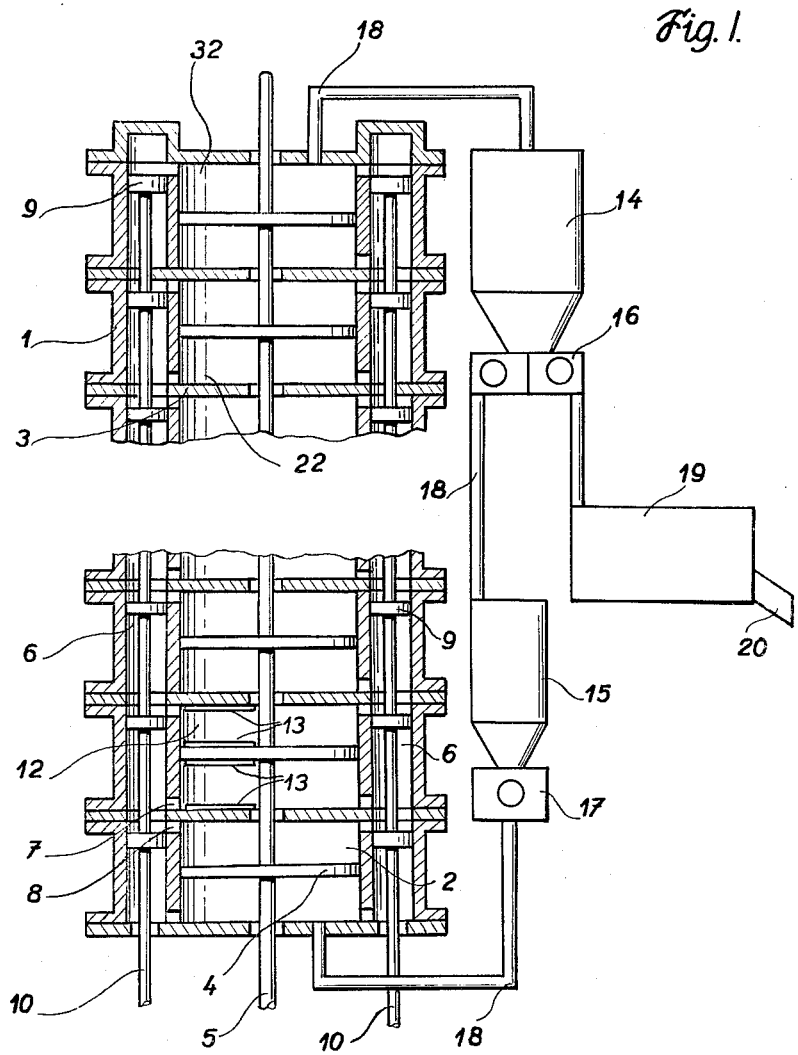

Nov. 9, 1965  J. KRATOCHVÍL  3,216,908
DEVICE FOR THE CONTINUOUS PRODUCTION
OF FERMENTED DOUGH MASSES
Filed July 6, 1960  2 Sheets-Sheet 1

INVENTOR.
Josef Kratochvil

Nov. 9, 1965  J. KRATOCHVÍL  3,216,908
DEVICE FOR THE CONTINUOUS PRODUCTION
OF FERMENTED DOUGH MASSES
Filed July 6, 1960  2 Sheets-Sheet 2
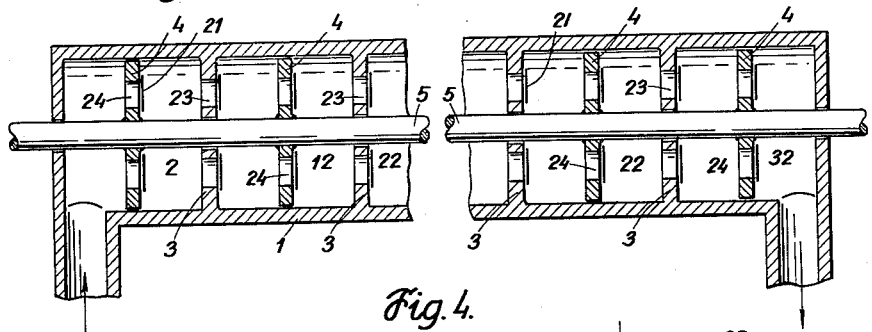
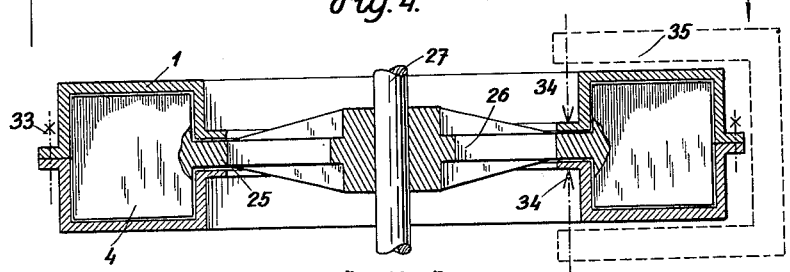
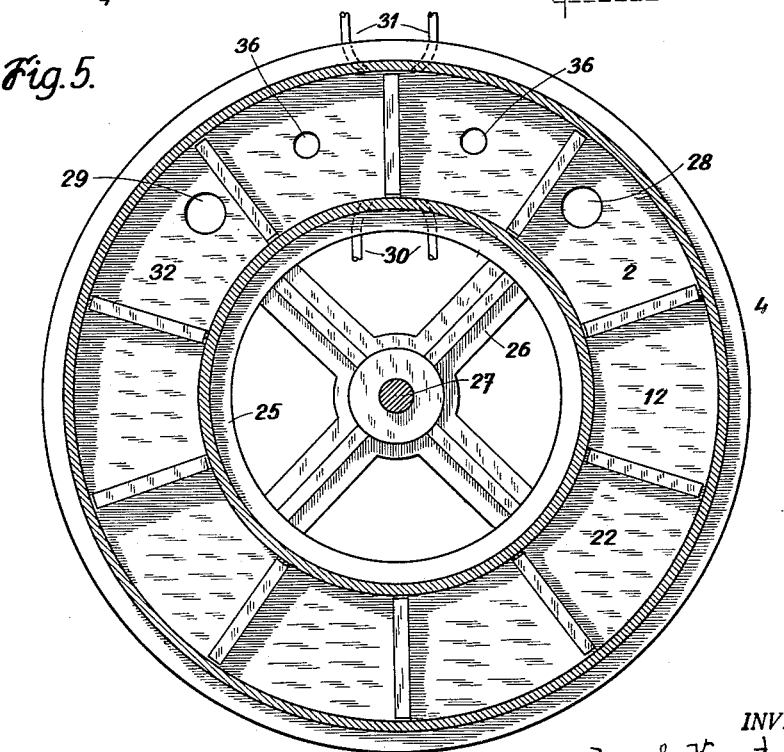
INVENTOR.
Josef Kratochvíl
BY

United States Patent Office 3,216,908
Patented Nov. 9, 1965

3,216,908
DEVICE FOR THE CONTINUOUS PRODUCTION OF FERMENTED DOUGH MASSES
Josef Kratochvil, Praha, Czechoslovakia, assignor to Jihoceske mlyny a pekarny, narodni podnik, Ceske Budejovice, Czechoslovakia
Filed July 6, 1960, Ser. No. 41,128
7 Claims. (Cl. 195—141)

The present invention relates to an apparatus for continuous production of fermented dough masses.

A considerable disadvantage of the hitherto known devices for continuous production of fermented dough masses such as bread-dough or pastry-dough lies in the restricted possibility of using the same device for the production of different kinds of dough. Some of such devices permit continuous production of dough only under continuous addition of yeast and cannot be used for example for the production of ferment and further kinds of dough. Other known devices are not adapted for a continuous addition of yeast. The majority of known devices can operate according to a single method only, which fact considerably restricts their applicability in large baking plants. Such single-purpose devices are of little advantage, as a narrow specialization in the production of bakery goods is hardly feasible apart from being uneconomical in view of the limited durability of the articles produced. A great variety of bakery products being called for by the consumers, a continuously producing plant would have to be equipped with several types of producing devices, which would not only be expensive but also result in the loss of the main advantages of continuous production to save space and material.

In the continuous production of fermented dough masses (hereinafter termed "mass" for short), said mass undergoes a gradual maturing process in the course of a certain period of time, during which the mass advances from the place where the ingredients such as flour, water, matured leaven or other fermenting substances and possibly further additions are brought in, to the place where the mass leaves the fermentation space. The main difficulties in the known devices consist therein that the progress of the mass is not uniform at all points of the cross sectional area of the flow. Near the walls or at other points of the fermentation space the rate of flow of the mass is rather small and often almost nil, because of friction and adhesion to the walls, while in the centre of the flow for example in the centre of a tubular fermentation space serving for the manufacture of ferment, the velocity is at its maximum. During the fermentation process the volume of the mass increases due to the formation of gas bubbles, chiefly at places where the rate of flow is at the maximum. The produced gases reduce the average density of the mass and its non-uniformly distributed velocity is increased at some points of the cross sectional area. On the other hand, the adhesion to the walls or to other places in the fermentation space leads to a deterioration of the biological condition of the mass, so that the produced fermented dough contains a mixture of particles of different biological age and different technological quality. This fact leads to a general deterioration in quality and to a small yield of products because of the incorrect fermentation process and the non-uniform swelling of starch and albumin.

The object of the present invention is to eliminate or to substantially reduce the aforementioned disadvantages. The main feature of the invention consists therein that a positive uni-directional movement in one direction is imparted to the treated mass in the fermentation space by means of movable partitions preventing the intermixing of the treated mass in the fermentation space, which has the shape of a cylinder or trough and is longitudinally divided into compartments by said movable partitions. The partitions have the form of mechanically connected pistons or similar members.

The said and other objects of my invention will be more fully understood from the following specification when read with the accompanying drawing wherein:

FIG. 1 shows my new apparatus partly in longitudinal section and partly in an elevational view, FIG. 2 shows in longitudinal section a modified embodiment of the inlet portion of the fermentation space, FIG. 3 is a similar representation of the outlet portion of the fermentation space, FIG. 4 shows another modification of the fermentation space in an axial section and FIG. 5 is the corresponding plan view.

As shown in FIG. 1 the cylindrical fermentation chamber 1 is divided by means of fixed partitions 3 into individual compartments 2, 12, 22, 32 . . . etc. In each of said compartments is one of a plurality of reciprocable movable pistons or similar dividers 4 activated by a common piston rod 5 which passes freely through the fixed partitions 3. On opposite sides of the cylinder 1 channels 6 are arranged, connecting the spaces in the various compartments 2, 12, 22, 32 etc. in front of and respectively behind the pistons 4 by means of lateral passageways 7, 8 located at the upper and lower extreme positions of the pistons 4. In the channels 6 flow regulating members are provided in the shape of slides 9, which are connected by means of a rod 10. The pistons 4 and slides 9 carry out independent though coordinated movements with the aid of cams, eccentrics or the like, not illustrated.

The whole fermentation cylinder 1 is incorporated into a circuit consisting of a carbonic acid separator 14 and a mixer 15, which are connected by a piping 18 over pumps 16 and 17. These members do not form part of the present invention.

The described device operates as follows: The mass is continuously fed by the pump 17 from the mixer 15 into the fermentation cylinder 1. Assuming that all compartments 2, 12 etc. of the fermentation cylinder 1 are filled with the mass and the pistons 4 move downwards from their upper end position, the passageways 7, 8 of neighbouring compartments are separated from one another by the slides 9, i.e. the slides are positioned just between the passageways 7 and 8 of two adjacent compartments. The mass located below the pistons 4 is pressed through the passages 6 and upper passageways 8 into the space of the same compartment above the piston. After the pistons 4 have reached their lowest position the slides 9 are moved downward to assume a position underneath the passageways 8 as illustrated in FIG. 1. Upon upward movement of the pistons 4 the mass is pressed from the spaces above the pistons through the upper passageways 8, passages 6 and lower passageways 7 into the spaces underneath the piston 4 of the following compartment. Thus the mass is advanced step by step from one compartment to the next in the direction to the discharge from the last compartment indicated with he reference numeral 32. This procedure is continuously repeated, and thus the mass proceeds in the fermentation cylinder from its inlet to its outlet. The matured mass is then supplied to the carbonic acid separator 14 through the pipe 18.

In said separator the mass is freed from superfluous inflating gas and enters the double pumps 16. Here it is distributed in desired proportion for example, two thirds and one third, respectively on the one hand into the mixer 15, on the other hand into the kneading machine 19. In the mixer 15 water and flour, and if need be other ingredients, are added and thoroughly mixed. In this way fresh leaven is prepared, which by means of the pump 17 is again fed into the first compartment 2 of the fermentation cylinder 1, where it gradually matures, as described above.

To the other part of the matured mass fed from the separator 14 through the pump 16 into the kneading machine 19, flour, salt solution and required other ingredients are added. The dough thus prepared continuously in the kneading machine leaves through the aperture 20 to be distributed and shaped during further procedure.

In the described manner the production of ryebread is carried out with any desired addition of wheat flour, further wheat bread with a slight addition of rye flour or other flour, also white wheaten bread and pastry from white wheat flour.

The gases evolving from the dough during its fermentation can escape from the fermentation cylinder 1 in the following way: at the moment, when the pistons 4 start to move downwards, one row of slides 9, for example the right one, remains for a short while in the position between the passageways 7 and 8 of two adjacent compartments, while the other (left) row of slides 9 releases the passageways 8 by moving downwards. In this position of the slides the gas can pass through all passageways 7 and 8 and escape into the separator 14.

For the purpose of cleaning inner walls of the various compartments 2 to 32 of the fermentation cylinder, of the partitions 3 and of the surfaces of pistons 4 from the adhering dough remainders, the pistons 4 are provided at their periphery with seals and on their side surfaces with diagonally extending rubber strips 13 or wipers, which are fixed in a transverse groove. The partitions 3 are provided at their surfaces with similar rubber strips or wipers 13. The cleaning operation is performed in such a manner that at the moment when the pistons 4 are in their lower or upper extreme position, i.e. in the closest proximity of the partitions 3, the piston rod 5 is rotated through 180° around its axis, for instance by means of a gear wheel (not shown) arranged at the end of the piston rod. The surfaces of the pistons 4 as well as of the partitions 3 thus wipe one another clean with the aid of the rubber strips pressed against them. The cylindrical inner walls of the fermentation space are wiped by the seals (not shown) arranged at the periphery of the pistons 4. Compartment 12, taken as a typical compartment, shows wipers 13 on opposing surfaces.

The fermentation space can, if required, be equipped with a double jacket for heating or cooling by means of a medium flowing therethrough.

The present invention is not limited to the arrangement of the fermentation space as shown in FIG. 1. Instead of the slides 9 it is for instance possible to provide valves mounted directly in all pistons 4 as well as in all partitions 3 in a similar way as in piston pumps or compressors. Such valves can be arranged so as to open in the direction of the moving dough only.

The before mentioned embodiments of the invention are shown diagrammatically in FIGS. 2 and 3. FIG. 2 shows the inlet portion of a closed fermentation space 1', whereas FIG. 3 represents the end portion of an open fermentation space. Slides 9 shown in FIG. 1 are here replaced by automatically closing valves or flaps 21— which are adapted to open the apertures 23 in fixed partitions 3' and the apertures 24 in pistons 4', in the direction of the desired movement of the mass only. The mass supplied in the direction of the arrow during movement of the pistons 4 to the right is expelled, for instance, from the space 2' to the space 12, from here to a further space 22 etc. The flaps 21 in the fixed partitions 3' open automatically the apertures 23, while the flaps 21 in the pistons 4 close the apertures 24. When reaching their extreme right hand position the pistons 4' start their return movement, the apertures 23 being closed and the apertures 24 opened by the flaps 21. The matured mass leaves the device in the direction of the arrow. The working process in the device according to FIGS. 2 and 3 is therefore identical with that according to FIG. 1.

The fermentation space can have the form of a tube 1 having a circular or any other suitable cross section, or the tube can be provided with gradually increased spaces 2, 22, 32 etc., so as to allow for the increasing volume of the mass during the latter stages of the maturing process.

The fermentation space can, according to a further modification of the invention, be of circular shape within a ringshaped casing, the movable partitions arranged in such casing moving in one direction only. In this embodiment fixed partitions 3 are not required.

Such embodiment is shown in FIG. 4 in an axial cross section and in FIG. 5 in a plan view, the top portion of the ring casing being removed for the sake of greater clarity.

In this embodiments the movable partitions 4 protrude radially into an annular casing 1, which consists of two parts for an easy assembly or dismantling of the device. The partitions are fixed to a rim 25 of a wheel 26, the hub of which is keyed to a rotatable shaft 27. The mass enters the space through an inlet aperture 28 and leaves the space 32 through an outlet aperture 29 in a way described in connection with the device shown in FIG. 1. Conduits 30 and 31 serve to supply hot water to rinse the partitions 4 when on their travel they reach a suitable position between the nozzles provided at the end of the conduits 30, 31. The nozzles do not protrude into the fermentation space. The rim 25 is sealed with respect to the casing and a suitable packing, preferably made of a synthetic material, such as a polyamide or the like, can be used for this purpose, said material having a low coefficient of friction with the material of the casing and, in addition, a long life. Both halves of the ring 1 are secured at the outer periphery by screws 33 or the halves are pressed against the rim 25 by means of outer frames 35, illustrated diagrammaticaly only, both ends of said frames exerting pressure in the direction of arrows 34 against the inner edge of the casing 1. The water which has rinsed the partitions 4 is drained through apertures 36. The partitions are sealed against the casing 1 by means of wipers (not shown) arranged at the periphery of said partitions.

It follows from the above description, that the present invention relates to a device for the production of fermented dough masses in which a positive movement is imparted to the mass in the direction from the inlet to the outlet of the mass by means of movable partitions or pistons, which prevent intermixing of the mass confined between these partitions. It is irrelevant whether the fermentation space of the device is open or closed or whether it is arranged horizontally or vertically. An open fermentation space is, of course, always arranged horizontally. The cross sectional shape of the space in which the partitions impart positive movement to the mass is also immaterial. The velocity of such movement can be altered according to the nature of the product and required technological conditions. The velocity is low, of the order of a few centimeters per minute, so that the drive required to overcome frictional forces can be of a relatively low power.

I claim:
1. An apparatus for continuous production of fermented dough masses comprising in combination:
   (a) an elongated fermentation chamber,
   (b) a plurality of fixed transverse partitions in said chamber dividing the same in longitudinal direction into a series of volumetrically gradually increasing compartments,
   (c) means for feeding the mass to be treated into the first of said compartments,
   (d) means for discharging the treated mass from the last compartment for further treatment thereof,
   (e) a reciprocable piston member in each compartment dividing the same into a forward and a rearward sectional space in the direction of the movement of the mass from the first compartment to the last compartment, (f) means for imparting simultaneous reciprocating movement to all piston members, (g) and valve means adapted to connect the forward sectional space of one compartment with the rearward sectional space of the next following compartment when the piston members move forward, and the forward and the rearward sectional space in each compartment when the piston members move backward.

2. An apparatus for continuous production of fermented dough masses comprising in combination:

(a) an elongated fermentation chamber, (b) a plurality of fixed transverse partitions in said chamber dividing the same in longitudinal direction into a series of succeeding compartments, (c) means for feeding the mass to be treated into the first of said compartments, (d) means for discharging the treated mass from the last compartment for further treatment thereof, (e) a reciprocable piston member in each compartment dividing the same into a forward and a rearward sectional space in the direction of the movement of the mass from the first compartment to the last compartment, (f) means for imparting simultaneous reciprocating movement to all piston members, (g) at least one by-pass channel next to the fermentation chamber coextending longitudinally therewith, (h) a passageway connecting each of said forward and said rearward sectional spaces with said by-pass channel, (i) and a plurality of reciprocable control members in said by-pass channel controlling said passageways to connect alternately the forward sectional space of one compartment with the rearward sectional space of the next following compartment when the piston members move forward, and the rearward sectional space in each compartment when the piston members move backward.

3. An apparatus according to claim 2 comprising a cylindrical fermentation chamber and a common piston rod attached to each piston member.

4. An apparatus according to claim 2 wherein said passageways are located on each side of and next to said fixed transverse partitions and slide valves reciprocably mounted in said by-pass channel adapted to alternately control the said passageways.

5. An apparatus according to claim 3 comprising a piston rod rotatably and slidably mounted in said fixed transverse partitions and attached to each piston member and a wiper attached to each surface of said transverse partitions and said piston members for wiping the opposing surface clean when said rotatable piston rod is rotated at the top and bottom of its stroke.

6. An apparatus according to claim 2 wherein the volumes of the succeeding compartments gradually increase in the direction of the movement of the mass.

7. An apparatus for continuous production of fermented dough masses comprising in combination:

(a) an elongated fermentation chamber, (b) a plurality of fixed transverse partitions in said chamber dividing the same in its longitudinal direction into a series of volumetrically gradually increasing compartments, (c) means for feeding the mass to be treated into the first of said compartments, (d) means for discharging the treated mass from the last compartment for further treatment thereof, (e) a reciprocable piston member in each compartment dividing the same into a forward and a rearward sectional space in the direction of the movement of the mass from the first compartment to the last compartment, (f) means for imparting simultaneous reciprocating and rotating movement to all piston members comprising a piston rod rotatably and slidably mounted in said fixed transverse partitions and attached to each piston member, a wiper mounted on both surfaces of each of said pistons and each of said partitions whereby at the end of a piston stroke the rod is rotated and said opposing partition and member surfaces are wiped by the wiper mounted on the opposing surface, and (g) back pressure valve means in each piston member and in each fixed partition, said valve means opening in the direction of the movement of the mass from the first compartment to the last compartment and allowing flow of dough from the forward sectional space of one compartment to the rearward sectional space of the next following compartment when the piston members move forward, and from the rearward to the forward sectional space in each compartment when the piston members move backwards.

References Cited by the Examiner

UNITED STATES PATENTS

| | | | |
|---|---|---|---|
| 338,579 | 3/86 | Andersen et al. | 195—141 |
| 998,472 | 7/11 | Darrow | 103—194 |
| 1,073,126 | 9/13 | Hitchcock | 107—57 |
| 1,595,439 | 8/26 | Wilson et al. | 107—7.6 |
| 1,703,182 | 2/29 | Tessin | 107—54.2 |
| 2,099,937 | 11/37 | Lauterbur | 107—4 |
| 2,253,770 | 8/41 | Duffy | 107—54.2 |
| 2,538,466 | 1/51 | Marco | 259—9 |
| 2,624,288 | 1/53 | Reilly | 103—194 X |
| 2,737,129 | 3/56 | Johnson et al. | 107—4 |
| 2,920,964 | 1/60 | Oakes | 107—4.2 |
| 2,931,320 | 4/60 | Bandel | 259—9 X |
| 2,952,588 | 9/60 | Rinderer | 195—143 |
| 2,953,460 | 9/60 | Baker | 107—4.2 X |
| 3,001,486 | 9/61 | Duncan et al. | 259—9 X |
| 3,027,305 | 3/62 | Freeman | 195—127 |
| 3,039,397 | 6/62 | Prasse et al. | 103—83 |
| 3,075,473 | 1/63 | Finley | 103—168 X |

FOREIGN PATENTS 555,769   4/58   Canada.

A. LOUIS MONACELL, *Primary Examiner.*

JOSEPH D. SEERS, *Examiner.*